(No Model.)

T. TURTON.
Crank Shaft and Axle.

No. 241,760.　　　　　Patented May 17, 1881.

Witnesses:
A. Hanauer
E. W. Otto

Inventor:
Thomas Turton
by James S. Kay
Attorney

UNITED STATES PATENT OFFICE.

THOMAS TURTON, OF LIVERPOOL, COUNTY OF LANCASTER, ENGLAND.

CRANK SHAFT AND AXLE.

SPECIFICATION forming part of Letters Patent No. 241,760, dated May 17, 1881.

Application filed January 26, 1881. (No model.) Patented in England April 8, 1880.

*To all whom it may concern:*

Be it known that I, THOMAS TURTON, of Liverpool, in the county of Lancaster, England, have invented a new and useful Improvement in Crank-Shafts and Crank-Axles, (for which I have obtained a patent in Great Britain, No. 1,431, bearing date April 8, 1880,) of which the following is a specification.

Crank shafts and axles, as heretofore made, have been liable to break and fracture mainly in consequence of defects in manufacture, and the fact is many failures have occurred in steamships and on railways from such breakages and fractures. The greater the crank shafts and axles the more liable are they to be defective, from the difficulty of making sound homogeneous forgings where large and weighty masses of metal have to be operated upon, and this fact is becoming more and more apparent, as steamships are continually being constructed to carry greater burdens, and are consequently provided with more powerful engines.

The objects of my invention are, first, to provide crank shafts and axles so constructed that breakage or rupture is unlikely to occur on account of the fibers of the metal of which these important parts of engines are made being disposed in the directions best calculated to resist the strains to which they will be exposed; second, to afford facilities for removal and replacement of damaged or injured parts; third, to reduce the difficulties of forging; and, fourth, enable the said crank shafts and axles to be manufactured in less time.

In carrying my invention into practice, I, with single cranks, make or form the shaft or axle and part of a web in one piece, and the crank-pin and part of a web also in one piece, and I connect the parts together by bolts and nuts, or their equivalents, with or without the addition of dovetail joints or adjusting or strain-bearing pieces. In double cranks the crank-pin is made in one piece with a web at each end.

Figure 1:
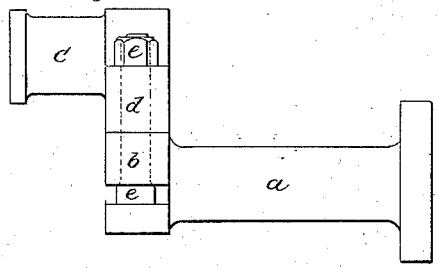
Figure 2:
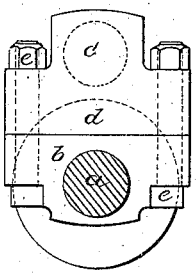

Figure 1 is a side elevation, and Fig. 2 an end elevation, of a single crank axle or shaft of the simplest construction under my invention. Figs. 3 to 11 are end views of various modifications of crank-shafts, either double or single, constructed under my invention; and Fig. 12 is a side elevation, and Fig. 13 an end view, of a double crank shaft or axle under my invention.

The same letters denote like parts in all the views.

Figs. 1 and 2: $a$ is the shaft or axle, made or formed in one piece with the portion of a web, $b$. $c$ is the crank-pin, made or formed in one piece with the portion of a web, $d$. $e$ are bolts and nuts for connecting and holding parts together. The bolts are accurately turned and fit carefully-bored holes in the webs.

Figure 3:
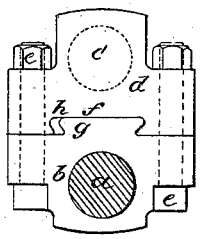

Fig. 3: $a$, shaft or axle; $b$, web; $c$, crank-pin; $d$, web; $e$, bolts and nuts; $f$, dovetail groove; $g$, projection fitting therein; $h$, key.

Figure 4:
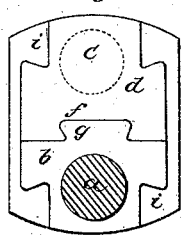

Fig. 4: Here clips $i$, shrunk on the webs $b\ d$, are employed instead of bolts and nuts, and the webs are made or formed with dovetail joints without keys.

Figure 5:
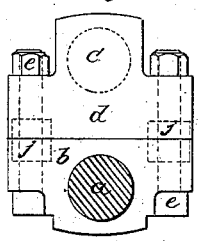

Fig. 5: Here sleeves of steel, $j$, fit accurately around the bolts $e$, in enlarged recesses in the bolts in the web, and relieve the bolts from cross-strains.

Figure 6:
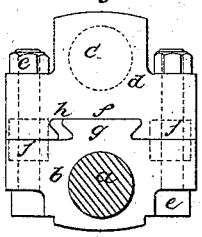

Fig. 6: Here both dovetail joints $f$ and sleeves $j$ are used in combination with the bolts and nuts $e$.

Figure 7:
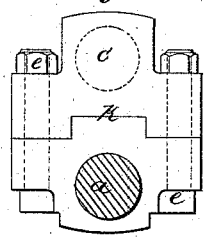

Fig. 7: Here the webs are made or formed with a plain groove and recess, $k$.

Figure 8:
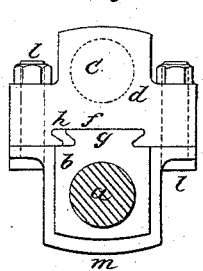

Fig. 8: In this view bolts and nuts $l$ and a strap, $m$, act as the equivalents of the bolts and nuts $e$.

Figure 9:
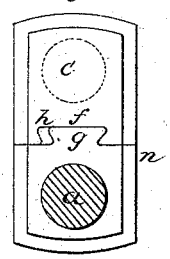

Fig. 9: In the crank shaft or axle here shown a strap, $n$, is shrunk on around the webs and acts as the equivalent of the bolts and nuts $e$.

Figure 10:
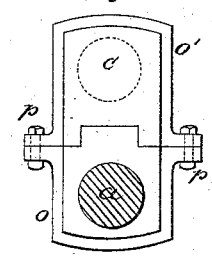

Fig. 10: Here two straps, $o\ o'$, and bolts and nuts $p$, serve the purpose of the bolts and nuts $e$.

Figure 11:
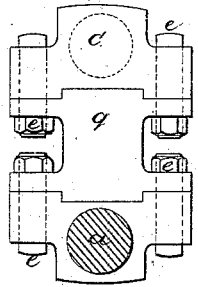
Figure 12:
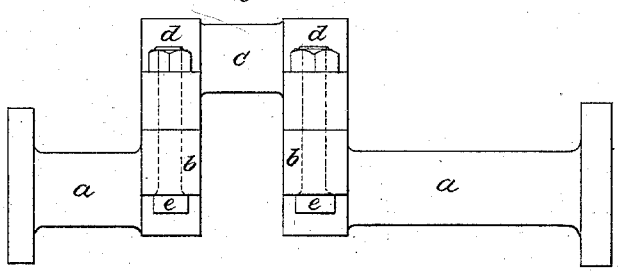

Fig. 11: Here between the webs $b$ a lengthening-piece, $q$, is interposed, and two sets of bolts and nuts, $e$, connect the parts together.

Figure 13:
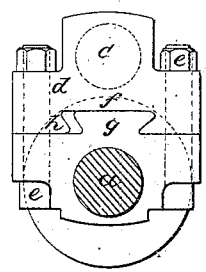

Figs. 12 and 13 illustrate a double-crank shaft or axle constructed under my invention; $a$, axles; $b$, webs made or formed therewith; $c$, crank-pin; $d$, webs made or formed therewith; $e$, connecting bolts or nuts; $f$, dovetail joints; $h$, keys. The grooves and projections may be in either of the portions of the webs, $b$ or $d$.

By my improved crank axles and shafts I am enabled to obtain the lay of all the fibers in the separate pieces forming the crank in a longitudinal direction, and this disposition of the fibers of the metal is best calculated to resist the strain to which cranks and axles are subjected where there are separate bolts or equivalent devices to take the cross or torsional strain, the webs of the cranks acting as liners between the bolts. As the crank-pins frequently become scored or fractured, on account of the heavy strain, by my invention a perfect part may be substituted for the worn or fractured part, the whole axle not being rendered useless by such scoring or fracture.

I am aware that before the date of my invention crank shafts and axles have been constructed in parts having flanges and bolted together, and I do not claim such construction generally; but What I do claim as my invention, and desire to secure by Letters Patent, is—

1. A crank shaft or axle having the shaft and part of the web formed in one piece, and the crank-pin and part of the web formed in one piece, the parts being secured together in the bend of the crank, substantially as and for the purposes set forth.

2. In crank shafts or axles, the combination of the shaft $a$ and web $b$ and crank-pin $c$ and web $d$, connected together by bolts and nuts $e$, substantially as and for the purposes set forth.

3. In crank shafts or axles, the combination of the shaft $a$ and web $b$, crank-pin $c$ and web $d$, dovetail connection $f\,g$, and nuts and bolts $e$, substantially as and for the purposes set forth.

4. In crank shafts or axles, the combination of the shaft $a$ and web $b$, crank-pin $c$, and web $d$, dovetail connection $f\,g$, and key $h$, substantially as and for the purposes set forth.

5. In crank shafts and axles, the combination of the shaft $a$ and web $b$, crank-pin $c$ and web $d$, sleeves $j$, and nuts and bolts $e$, substantially as and for the purposes set forth.

6. In crank shafts and axles, the combination of the shaft $a$ and web $b$, crank-pin $c$, and web $d$, tongue-and-groove joint, and encircling strap or clip, substantially as and for the purposes set forth.

THOMAS TURTON.

Witnesses:
JAMES JOHNSON,
W. B. JOHNSON.